US012440032B1

(12) United States Patent
Mesa Dominguez

(10) Patent No.: US 12,440,032 B1
(45) Date of Patent: Oct. 14, 2025

(54) CHAISE CHAIR WITH COVERED DISPLAY

(71) Applicant: Alexander Mesa Dominguez, Miami, FL (US)

(72) Inventor: Alexander Mesa Dominguez, Miami, FL (US)

( * ) Notice: Subject to any disclaimer, the term of this patent is extended or adjusted under 35 U.S.C. 154(b) by 0 days.

(21) Appl. No.: 19/265,835

(22) Filed: Jul. 10, 2025

(51) Int. Cl.

| | |
|---|---|
| ***A47C 7/72*** | (2006.01) |
| ***A47C 1/14*** | (2006.01) |
| ***A47C 7/54*** | (2006.01) |
| ***A47C 7/66*** | (2006.01) |
| ***B64D 11/00*** | (2006.01) |

(52) U.S. Cl.
CPC .............. *A47C 7/666* (2018.08); *A47C 1/143* (2013.01); *A47C 7/54* (2013.01); *A47C 7/723* (2018.08); *A47C 7/727* (2018.08); *B64D 11/00153* (2014.12)

(58) Field of Classification Search
CPC ........... A47C 7/666; A47C 1/143; A47C 7/54; A47C 7/723; A47C 7/727; B64D 11/00153
USPC ................... 297/184.1, 184.14, 217.3–217.5
See application file for complete search history.

(56) References Cited

U.S. PATENT DOCUMENTS 6,354,044 B1 * 3/2002 Lagace, Jr. .......... A47C 15/004 52/79.5
8,534,753 B1 * 9/2013 Perez ..................... A47C 7/723 297/188.09
11,937,710 B2 * 3/2024 Hsu Besner ........... A47C 1/143
12,336,644 B2 * 6/2025 Milewski ............... A47C 7/723
2012/0211038 A1 * 8/2012 Pirshafiey ................ A47C 7/72 135/96
2013/0154315 A1 * 6/2013 Kilzer .................... A47C 1/022 297/180.13
2014/0084642 A1 * 3/2014 Park ....................... A47C 7/748 297/188.05
2017/0340122 A1 * 11/2017 Anderson ................ A47C 7/72
2019/0104852 A1 * 4/2019 Stroman ................ A47C 7/029
2020/0113299 A1 * 4/2020 Akin ................... H01M 50/213
2020/0221876 A1 * 7/2020 Morales ................... A47C 7/66
2024/0156268 A1 * 5/2024 Milewski ................. A47C 1/03

* cited by examiner

*Primary Examiner* — Robert Canfield
(74) *Attorney, Agent, or Firm* — Ruben Alcoba, ESQ.

(57) ABSTRACT

A multifunctional chaise chair for outdoor use enhances smart device usability and user comfort. The chair includes a seating assembly, support system, and an upper cover assembly with a frontal panel strategically positioned parallel to the backrest to hold a smart device, and an overhead panel for shade. This arrangement improves display visibility by reducing bright light reflections while maintaining a natural, comfortable viewing angle. The chair incorporates a solar power system, a wireless communication module for internet and device connectivity, and at least one of a multi-function interface port or wireless power transfer module for data and power delivery. Optional collapsible side panels made of partially light-transmissive, air-permeable material reduce reflections and allow airflow. Additional features include a mist sprayer, speaker assembly, and adjustable seating and device positioning to accommodate users of different heights and preferences.

11 Claims, 3 Drawing Sheets

CHAISE CHAIR WITH COVERED DISPLAY

BACKGROUND

Outdoor seating solutions such as chaise chairs, lounge chairs, and recliners are commonly used in residential patios, public beaches, resorts, and poolside settings. While these seating arrangements offer relaxation and physical comfort, they typically lack integrated technological features that would support modem mobile device usage, personal entertainment, or user-specific ergonomic adjustments. Users often bring personal electronic devices such as smartphones or tablets to outdoor environments for communication, streaming media, or reading. However, conventional chaise chairs and loungers do not address the challenges associated with viewing electronic device displays under bright ambient light or direct sunlight.

A persistent issue encountered in such outdoor settings is the difficulty of viewing the display of a smart device due to screen glare and bright light reflections. Even with high-brightness displays, device luminance is frequently insufficient to overcome intense ambient light, resulting in diminished display visibility and eye strain. Users are often forced to shade their devices manually, adjust their seating positions awkwardly, or forego device usage altogether in brightly lit outdoor conditions.

Additionally, existing chaise chairs and loungers do not typically provide convenient provisions for charging or powering devices in environments where electrical outlets are limited or unavailable. Users must rely on portable power banks or leave their devices idle when batteries deplete. Furthermore, conventional seating solutions lack integrated wireless communication modules or device interface ports, preventing seamless data and power connectivity.

Moreover, comfort-enhancing features such as mist sprayers or integrated audio systems are absent in most existing outdoor lounge chairs, leaving users to rely on external equipment or accessories that may be cumbersome or impractical in certain environments. Many products also lack adjustability features to comfortably accommodate users of different heights or ergonomic needs, and the absence of adaptable shade or side cover panels leaves users and devices exposed to sun glare and heat.

The present invention addresses these disadvantages by providing a chaise chair for improved functionality that integrates an upper cover assembly designed to shield the display of a smart device from bright light reflections, thereby enhancing display visibility. The chair incorporates side cover panels made of partially light-transmissive, air-permeable material to further reduce glare while maintaining airflow. It also integrates a solar power generation system, multi-function interface ports, wireless power transfer modules, and a wireless communication module for continuous device operation and internet connectivity in remote or outdoor locations. Additional features such as a mist sprayer for user cooling, an integrated speaker assembly for audio output, and adjustable device positioning enhance both convenience and comfort. Furthermore, the chair is designed to ergonomically accommodate users of varying heights, offering a comprehensive and adaptable outdoor seating solution that overcomes the limitations of conventional products.

SUMMARY

The present invention relates to a multifunctional chaise chair designed to enhance outdoor relaxation experiences by integrating smart device support, environmental control features, and independent power supply capabilities. More particularly, the invention provides a chaise chair equipped with an upper cover assembly configured to support a smart device while improving display visibility in bright outdoor environments, thereby overcoming limitations commonly associated with using electronic devices in such settings.

An object of the present invention is to provide a chaise chair that allows a seated user to comfortably view the display of a smart device outdoors without the need for upward or downward adjustment of their line of sight and without impairment from bright light reflections that typically hinder screen visibility.

To achieve this object, the invention includes a seating assembly with a backrest, headrest, leg rest, and armrests; an upper cover assembly incorporating a frontal panel strategically positioned parallel to the backrest for mounting a smart device in an optimal viewing plane, and an overhead panel for shade. Optional collapsible side panels made from partially light-transmissive, air-permeable materials are provided to further reduce bright light reflections while permitting ambient airflow. The system also integrates a solar power generation system for supplying electrical power, a multi-function interface port and/or wireless power transfer module for device charging and data communication, and a wireless communication module for internet connectivity and short-range communication. Additional features such as a mist sprayer, speaker assembly, adjustable smart device positioning, and seating adaptability for users of varying heights further enhance the functionality, comfort, and convenience of the chaise chair.

This innovative configuration addresses the deficiencies of conventional outdoor seating furniture by improving device usability, user comfort, and system autonomy in outdoor environments.

BRIEF DESCRIPTION OF THE DRAWINGS

These and other features, aspects, and advantages of the present invention will become better understood with regards to the following description, appended claims, and drawings where:

DESCRIPTION

Figure 1:
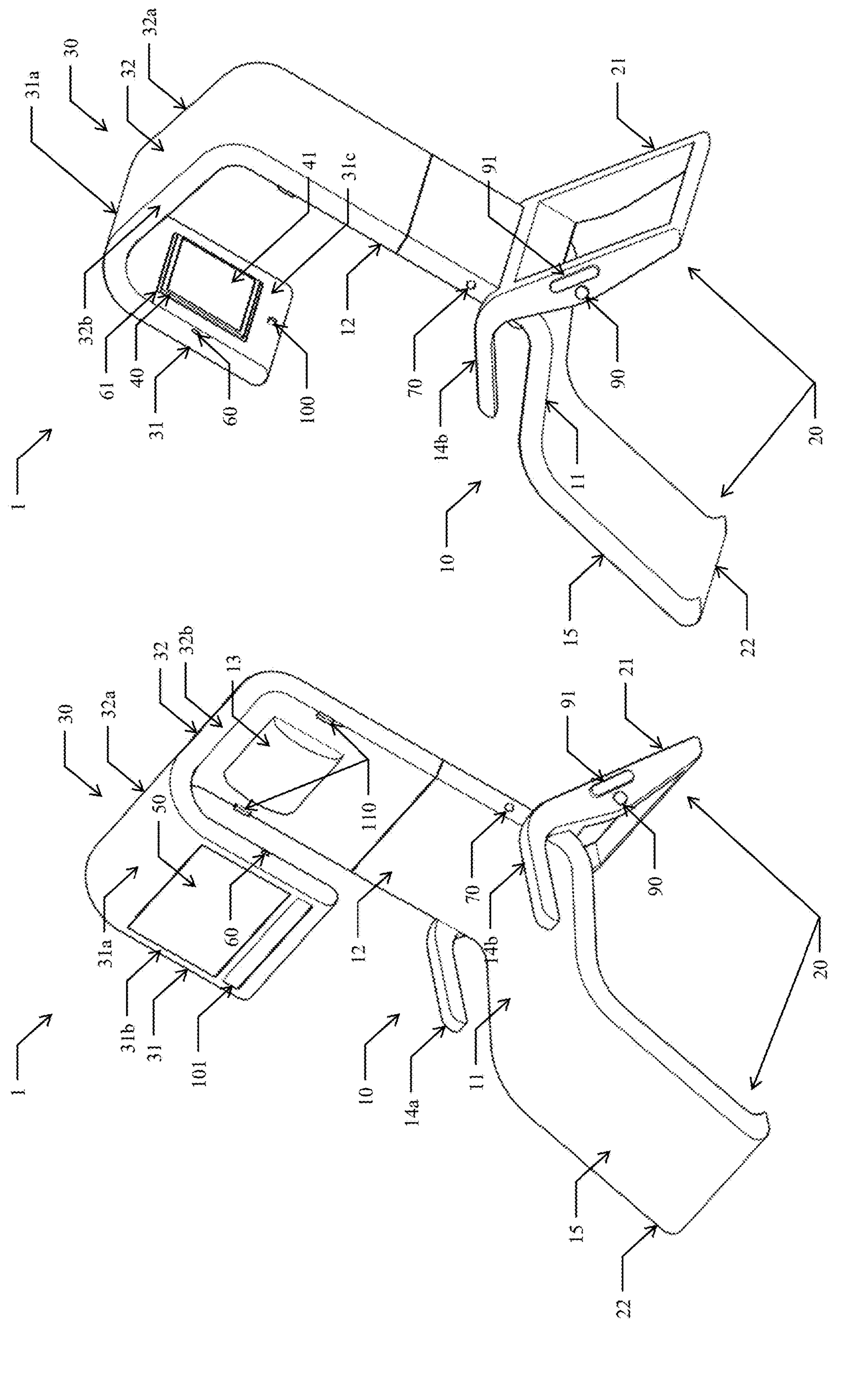
FIG. 1 shows a frontal and rear perspective view of the chaise chair.
Figure 2:
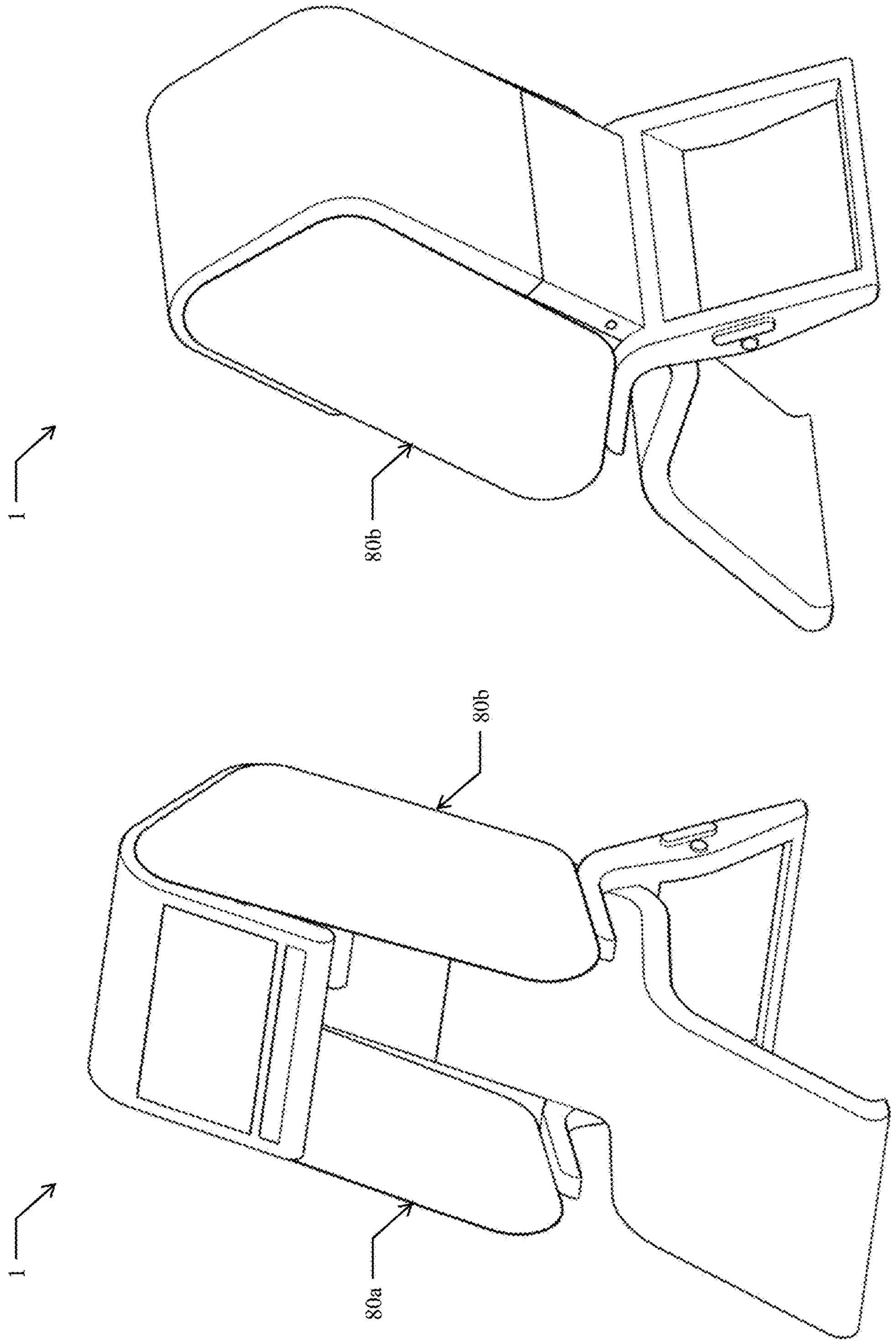
FIG. 2 shows a frontal and rear perspective view of the chaise chair with the side cover panels.
Figure 3:
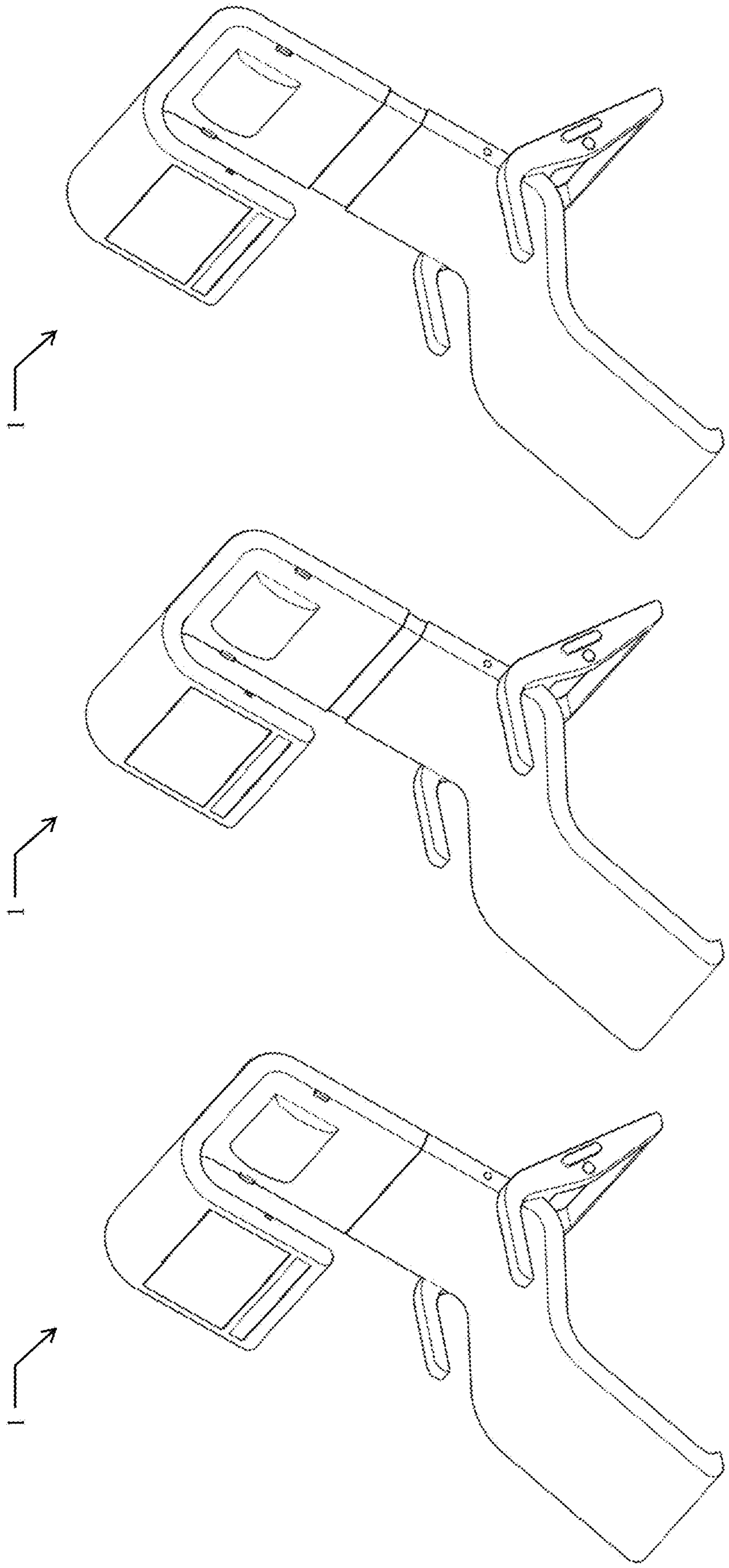
FIG. 3 shows the chaise chair adjusted to three different seated user heights.

As seen in FIGS. 1-3, the present invention is a chaise chair for improved functionality. The chaise chair 1 comprises a seating assembly 10 that has a seat member 11, a backrest member 12 with a headrest section 13, a right armrest member **14*a*, a left armrest member 14*b* and a leg rest member 15. A support system 20 for the seating assembly 10. And, an upper cover assembly 30 that has a frontal panel 31 and an overhead panel 32, the frontal panel 31 defines a proximal end 31*a*, a frontal surface 31*b* and a rear surface 31*c*, and extends over and parallel to the backrest member 12 of the seating assembly 10, the frontal surface 31*b* is configured to face a seated user of the chaise chair 1 and to receive a smart device 40 with a display 41, the rear surface 31*c* integrates a solar power generation system 50 configured to supply electrical power to the chaise chair 1, the overhead panel 32 spans between the proximal end 31*a*** and the seating assembly 10 above the headrest section 13, the frontal panel 31 and the overhead panel 32 are each opaque. Wherein the upper cover assembly 30 is configured to provide adequate visibility of the display 41 of the smart device 40, which is otherwise impaired due to insufficient display luminance to overcome bright light reflections, and to allow the seated user of the chaise chair 1 to directly view the display 41 of the smart device 40 without requiring upward or downward adjustment of their line of sight.

In an embodiment of the present invention, the rear surface 31*c* of the frontal panel 31 of the upper cover assembly 30 integrates a solar power generation system 50 configured to supply electrical power to the chaise chair 1, the chaise chair 1 further comprises at least one of a multi-function interface port 60 and a wireless power transfer module 61 configured to enable data communication, power delivery or a combination thereof to the smart device 40, and a wireless communication module 70 configured to support wireless internet connectivity, short-range device communication, or both.

In another embodiment of the present invention, the chaise chair 1 further comprises a right side cover panel 80*a* and a left side cover panel 80*b* configured to improve the visibility of the display 41 of the smart device 40, the right side cover panel 80*a* extends from a right side 32*a* of the overhead panel 32 of the upper cover assembly 30 to the right armrest member 14*a* of the seating assembly 10, the left side cover panel 80*b* extends from a left side 32*b* of the overhead panel 32 of the upper cover assembly 30 to the left armrest member 14*b* of the seating assembly 10, the right and left side cover panels are each made of a material that is partially light-transmissive and air-permeable, thereby reducing bright light reflections that impair visibility of the display 41 of the smart device 40 while still allowing ambient airflow through.

In another embodiment of the present invention, the right and left side cover panels are collapsible.

In another embodiment of the present invention, the support system 20 for the seating assembly 10 consists of a leg member 21 and a leg rest member extension 22.

In another embodiment of the present invention, the multi-function interface port 60 is a USB port.

In another embodiment of the present invention, the chaise chair 1 further comprises a power interface port 90 configured to transfer electrical power to a battery 91, the battery 91 is configured to supply supplemental electrical power to the chaise chair 1 as needed.

In another embodiment of the present invention, the frontal panel 31 of the upper cover assembly 30 comprises a mist sprayer 100 configured to dispense mist from a water reservoir 101.

In another embodiment of the present invention, wherein the chaise chair 1 further comprises a speaker assembly 110 to output audio signals.

In another embodiment of the present invention, the chaise chair 1 is configured to adjustably accommodate seated users of different heights.

In yet another embodiment of the present invention, the position of the smart device 40 along the frontal surface 31*b* of the front panel 31 of the upper cover assembly is adjustable.

An advantage of the present invention is that it provides a chaise chair specifically configured to improve the visibility of a smart device display in bright outdoor environments, addressing issues of insufficient display luminance and bright light reflections. This is accomplished by integrating an upper cover assembly with opaque frontal and overhead panels, wherein the frontal panel is strategically disposed parallel to the backrest of the chaise chair. This parallel arrangement positions the display area within a shaded, forward-facing plane that enables direct, comfortable viewing without requiring upward or downward adjustment of the user's line of sight.

Another advantage of the present invention is that it enhances display visibility even further by incorporating right and left side cover panels made of a partially light-transmissive, air-permeable material, which effectively reduces bright light reflections from lateral angles while maintaining ambient airflow, improving both visual comfort and thermal comfort for the seated user.

Another advantage of the present invention is that the right and left side cover panels are collapsible, providing versatility by allowing users to selectively deploy or stow the panels based on environmental conditions and personal preference, thereby enhancing the adaptability and portability of the chaise chair.

Another advantage of the present invention is that it includes at least one multi-function interface port, such as a USB port, or a wireless power transfer module, or both, enabling convenient data communication, device charging, and wireless power transfer to a smart device, which ensures continuous device operation in outdoor or remote settings.

Another advantage of the present invention is that it integrates a power interface port connected to a supplemental battery, enabling the chaise chair to store and supply electrical power as needed, thereby supporting the operation of onboard systems such as lighting, audio output, mist spraying, and device charging in the absence of a continuous external power supply.

Another advantage of the present invention is that it optionally includes a mist sprayer integrated into the frontal panel of the upper cover assembly, dispensing fine mist from an associated water reservoir to help cool the seated user and improve overall comfort in warm outdoor conditions.

Another advantage of the present invention is that it can include a speaker assembly, providing audio output for music, notifications, or other sound content in conjunction with the smart device, thereby enhancing the user's entertainment experience while seated in the chaise chair.

Another advantage of the present invention is that it is configured to adjustably accommodate users of different heights, making it ergonomically adaptable and inclusive for a broader range of users, thereby improving comfort and usability.

Still another advantage of the present invention is that it enables the position of the smart device along the frontal surface of the upper cover assembly's front panel to be adjustable, allowing users to reposition the device to an optimal viewing height or angle relative to their seated position, further enhancing ergonomic comfort and display visibility.

The embodiments of the chaise chair for improved functionality herein are exemplary and numerous modifications, combinations, variations, and rearrangements can be readily envisioned to achieve an equivalent result, all of which are intended to be embraced within the scope of the appended claims. Further, nothing in the above-provided discussions of the chaise chair for improved functionality should be construed as limiting the invention to an embodiment or a combination of embodiments. The scope of the invention is defined by the description, drawings, and claims.

What is claimed is:

1. A chaise chair for improved functionality, the chaise chair comprises:

a seating assembly that has a seat member, a backrest member with a headrest section, a right armrest member, a left armrest member 14*b* and a leg rest member;

a support system for the seating assembly; and an upper cover assembly that has a frontal panel and an overhead panel, the frontal panel defines a proximal end, a frontal surface and a rear surface, and extends over and parallel to the backrest member of the seating assembly, the frontal surface is configured to face a seated user of the chaise chair and to receive a smart device with a display, the overhead panel spans between the proximal end a and the seating assembly above the headrest section, the frontal panel and the overhead panel are each opaque;

wherein the upper cover assembly is configured to provide adequate visibility of the display of the smart device, which is otherwise impaired due to insufficient display luminance to overcome bright light reflections, and to allow the seated user of the chaise chair to directly view the display of the smart device without requiring upward or downward adjustment of their line of sight.

2. The chaise chair for improved functionality of claim 1, wherein the rear surface of the frontal panel of the upper cover assembly integrates a solar power generation system configured to supply electrical power to the chaise chair, the chaise chair further comprises at least one of a multi-function interface port and a wireless power transfer module configured to enable data communication, power delivery or a combination thereof to the smart device, and a wireless communication module configured to support wireless internet connectivity, short-range device communication, or both.

3. The chaise chair for improved functionality of claim 2, wherein the chaise chair further comprises a right side cover panel and a left side cover panel configured to improve the visibility of the display of the smart device, the right side cover panel extends from a right side of the overhead panel of the upper cover assembly to the right armrest member of the seating assembly, the left side cover panel extends from a left side of the overhead panel of the upper cover assembly to the left armrest member of the seating assembly, the right and left side cover panels are each made of a material that is partially light-transmissive and air-permeable, thereby reducing bright light reflections that impair visibility of the display of the smart device while still allowing ambient airflow through.

4. The chaise chair for improved functionality of claim 3, wherein the right and left side cover panels are collapsible.

5. The chaise chair for improved functionality of claim 2, wherein the support system for the seating assembly consists of a leg member and a leg rest member extension.

6. The chaise chair for improved functionality of claim 2, wherein the multi-function interface port is a USB port.

7. The chaise chair for improved functionality of claim 2, wherein the chaise chair further comprises a power interface port configured to transfer electrical power to a battery, the battery is configured to supply supplemental electrical power to the chaise chair as needed.

8. The chaise chair for improved functionality of claim 2, wherein the frontal panel of the upper cover assembly comprises a mist sprayer configured to dispense mist from a water reservoir.

9. The chaise chair for improved functionality of claim 2, wherein the chaise chair further comprises a speaker assembly to output audio signals.

10. The chaise chair for improved functionality of claim 2, wherein the chaise chair is configured to adjustably accommodate seated users of different heights.

11. The chaise chair for improved functionality of claim 2, wherein the position of the smart device along the frontal surface of the front panel of the upper cover assembly is adjustable.

* * * * *